United States Patent
Nielsen

(10) Patent No.: US 12,281,634 B2
(45) Date of Patent: Apr. 22, 2025

(54) DEVICE AND METHOD FOR ASSEMBLING WIND TURBINE

(71) Applicant: Vestas Wind Systems A/S, Aarhus N (DK)

(72) Inventor: Ben Møller Nielsen, Aarhus C (DK)

(73) Assignee: Vestas Wind Systems A/S, Aarhus N. (DK)

( * ) Notice: Subject to any disclaimer, the term of this patent is extended or adjusted under 35 U.S.C. 154(b) by 212 days.

(21) Appl. No.: 18/001,612

(22) PCT Filed: Jun. 9, 2021

(86) PCT No.: PCT/DK2021/050181
§ 371 (c)(1),
(2) Date: Dec. 13, 2022

(87) PCT Pub. No.: WO2021/254572
PCT Pub. Date: Dec. 23, 2021

(65) Prior Publication Data
US 2023/0220832 A1    Jul. 13, 2023

(30) Foreign Application Priority Data
Jun. 19, 2020    (EP) .................................... 20180973

(51) Int. Cl.
*E04H 3/00*    (2006.01)
*B21D 1/08*    (2006.01)
(Continued)

(52) U.S. Cl.
CPC ............... *F03D 13/10* (2016.05); *B21D 1/08* (2013.01); *F03D 13/20* (2016.05)

(58) Field of Classification Search
CPC ........ F03D 13/10; F03D 13/20; F03D 13/112; F16B 13/063
See application file for complete search history.

(56) References Cited

U.S. PATENT DOCUMENTS

| 5,593,261 A | 1/1997 | Giannuzzi et al. |
| 7,276,808 B2 * | 10/2007 | Weitkamp ............. E02B 17/027 290/55 |

(Continued)

FOREIGN PATENT DOCUMENTS

| CN | 110671278 A | 1/2020 |
| CN | 108087205 B | 5/2020 |

(Continued)

OTHER PUBLICATIONS

PCT, International Search Report and Written Opinion issued in PCT Application No. PCT/DK2021/050181, dated Jul. 21, 2021.
(Continued)

*Primary Examiner* — Basil S Katcheves
(74) *Attorney, Agent, or Firm* — Wood Herron & Evans LLP

(57) ABSTRACT

The invention relates to a device (100), a system (10) and a method for modifying the cross section of a tower section (1) of a wind turbine, wherein the tower section comprises a flange (4) located at an end (3) of the tower section having a plurality of through holes (5) spaced around its circumference for securing said tower section to another wind turbine section. The method comprises securing tensioning mechanism (14) to each of a pair of said plurality of through holes in the flange of the tower section, said pair of holes being generally opposed; and applying a tensile force between said pair of holes in the flange of the tower section.

17 Claims, 5 Drawing Sheets

(51) Int. Cl.
*F03D 13/10* (2016.01)
*F03D 13/20* (2016.01)

(56) References Cited

U.S. PATENT DOCUMENTS

| | | | | |
|---|---|---|---|---|
| 8,505,244 | B2* | 8/2013 | Gomez | F03D 13/20 |
| | | | | 52/745.18 |
| 9,316,208 | B2* | 4/2016 | Friis | F03D 80/00 |
| 9,533,428 | B2* | 1/2017 | Kapitza | E04G 13/02 |
| 11,255,312 | B2* | 2/2022 | Küpker | F03D 13/10 |
| 2010/0132282 | A1* | 6/2010 | Voss | E04C 5/07 |
| | | | | 52/223.5 |
| 2013/0025229 | A1* | 1/2013 | Kapitza | E04H 12/12 |
| | | | | 264/263 |
| 2013/0104376 | A1* | 5/2013 | Pedersen | F03D 80/00 |
| | | | | 29/525.02 |
| 2015/0308134 | A1 | 10/2015 | Bjoernskov et al. | |
| 2016/0312431 | A1* | 10/2016 | Coordes | F03D 13/22 |
| 2019/0161991 | A1* | 5/2019 | Mtauweg | E04H 12/085 |
| 2019/0170122 | A1* | 6/2019 | Longeru | E04H 12/342 |

FOREIGN PATENT DOCUMENTS

| | | |
|---|---|---|
| EP | 2538000 A2 | 12/2012 |
| EP | 2650447 A2 | 10/2013 |
| EP | 2998570 A1 | 3/2016 |
| EP | 3179099 A1 | 6/2017 |
| WO | 2015161854 A1 | 10/2015 |
| WO | 2020035770 A1 | 2/2020 |

OTHER PUBLICATIONS

European Patent Office, Extended European Search Report issued in EP Application No. 20180973.8, dated Nov. 25, 2020.

European Patent Office, Extended European Search Report issued in corresponding EP Application No. 21826903.3, dated Jun. 13, 2024.

* cited by examiner

DEVICE AND METHOD FOR ASSEMBLING WIND TURBINE

FIELD

The present disclosure relates to devices, systems and methods suitable for assembling the tower of a wind turbine (e.g. an offshore or onshore wind turbine). Aspects of the invention relate to devices, systems and methods which can be used to quickly and safely modify and/or maintain the shape of the cross section of a tower section of a wind turbine (e.g. during storage, transport, pre-assembly and/or assembly).

BACKGROUND

A horizontal axis wind turbine typically comprises a foundation on which is mounted a tower. The tower commonly supports a nacelle to which a rotor is mounted. The foundation, tower and nacelle of a wind turbine tend to be separate sections which are coupled together during assembly. Moreover, the tower of a wind turbine is typically further divided into multiple tower sections, which are in turn stacked and coupled together to form the full tower.

In order to join the separate sections of a wind turbines during pre-assembly of the tower or during installation of the wind turbine generator, the flanges of adjacent sections of the wind turbine must be similarly sized and shaped. It may be impossible to safely connect two wind turbine sections (e.g. two tower sections) if the cross sections of the sections to be coupled are not sufficiently similar.

Irregularities or inconsistencies in the shape of wind turbine sections may be caused by a variety of issues. For example, the tower sections of large wind turbine towers typically have very large widths or diameters and have thick walls to withstand the high forces placed on them. Consequently, tower sections tend to deform in the radial direction over time under their self-weight when stored on their sides (e.g. such that the longitudinal axis of the tower section is parallel to the ground). This may lead to different tower sections exhibiting different levels of ovality. Similarly, errors in manufacture or damage to the wind turbine sections after manufacture can result in the sections being deformed relative to their intended or original shape. As mentioned above, it may not be possible to safely join deformed sections (e.g. foundation, tower sections, nacelle, etc.) together.

EP 3179099 B1 describes two devices and corresponding methods for adjusting the ovality of a tower section. The first of these devices comprises tensioners that may be coupled between brackets attached to an internal wall of a circular tower section. Tension may be applied between the brackets to modify the diameter of the tower. However, the installation of brackets may complicate or delay the assembly of the tower (thereby also increasing installation costs) and diminish the strength of the tower section local to the brackets. Moreover, the complex tensioning system of EP 3179099 B1 is not easily transported or operated. The second device described in EP 31790099 B1 comprises a rod on which at least one hydraulic jack is disposed, the jack(s) being configured to force the opposing sides of the tower section apart. However, the rod is very large and difficult to handle—a crane is required to position the second device within a tower section.

Therefore, it will be seen that there is a desire for improved means for modifying the cross section of a wind turbine section.

SUMMARY OF INVENTION

The invention provides an improved method of adjusting and/or correcting irregularities or deformations in tower sections of wind turbines. Preferred examples of the invention alleviate and/or eliminate many of the disadvantages present in the prior art. In particular, devices, methods and systems in accordance with the invention enable for quicker, cheaper and/or safer assembly of wind turbines. The devices and systems discussed below are very compact and easy to install and operate.

Devices, systems and methods in accordance with the invention are well suited for use with tower sections such as the example shown in FIG. 1. The tower section 1, which is shown in a cut-away perspective view in the figure, has a substantially circular cross section and comprises a cylindrical wall 2 (although the invention is equally suited for use with tower sections with alternative forms). A peripheral or terminal flange 4 is formed at an end 3 of the tower section 1. The tower section 1 comprises a plurality of through holes 5 that each extend through the flange 4 and are spaced (preferably regularly spaced) around the circumference of the flange 4. The holes 5 extend in a direction that substantially parallel to the longitudinal axis of the tower section 1. In practice the plurality of through holes 5 may comprise from about 100 to about 300 holes, however, a reduced number of holes is shown in FIG. 1 for clarity.

The tower section 1 may be securely coupled to a further wind turbine section (e.g. a further tower section such as a transition piece or a nacelle flange) by inserting a bolt or stud through each hole 5 in the flange 4 and into a corresponding hole in the further wind turbine section (i.e. the holes are for securing said tower section to another wind turbine section using a bolt that is fitted in each hole). However, connecting wind turbine sections using bolts and/or studs is not possible if the cross sections of the wind turbine sections are inconsistent such that the plurality of holes 5 in the tower section 1 cannot be aligned with a corresponding plurality of holes in the further wind turbine section. As such, it may be desirable to apply forces to the tower section 1 to modify the cross section of the tower section (and thereby the arrangement of the plurality of holes 5) relative to a further wind turbine section. The forces required to modify the arrangement if the tower sections may be extremely high. It was found to be advantageous to use a force in the region of 100 kN to 150 kN (10 to 15 metric tonnes).

In accordance with an aspect of the invention there is provided a device for securing a tensioning mechanism to a flange located at an end of a tower section of a wind turbine, the device comprising: an expandable securing member configured to be located within a hole in the flange, said hole being one of a plurality of through holes spaced around the circumference of the flange for securing said tower section to another wind turbine section; and an expansion mechanism configured to expand the securing member, so as to urge the securing member into contact with an internal wall of said hole such that the securing member is braced against the internal wall and removal of the expanded securing member from the first hole is thereby inhibited by frictional resistance between the securing member and the internal wall; wherein the securing member has at least one attachment element configured to couple to the tensioning mechanism.

When the securing member of the device is expanded (i.e. placed in an expanded arrangement) a so called interference fit or friction fit may be formed between the securing member and a hole in which the securing member is inserted. This mating between the expanded securing member and the internal wall or surface of a hole is capable of withstanding and transferring the high forces required to modify the cross section of the tower section (which may be at least 50 kN and/or from 100 kN to 150 kN as discussed above). Thus tensile forces may be transferred from the tensioning mechanism to the flange of a tower section to which the device is secured (e.g. the tower section 1 shown in FIG. 1).

The device is easy to install since it may be inserted and expanded within a hole in the flange of a tower section very rapidly. Moreover, the device may be secured within the existing holes formed in a tower section that is to be used to receive a bolt or stud for securing said tower section to another wind turbine section. There is no need to perform any preparation steps to the tower section such as installing brackets or other fixing points to the tower section. Thus the modification of the cross section of a tower section may be performed quickly and without installing further fixing points or otherwise modify the tower or the flange. Furthermore, the device may be easily handled and transported, since the dimensions of the securing member (and the device in general) are limited by the dimensions of the holes in which the securing member may be inserted into.

The device is particularly effective at correcting irregularities such as ovality in a tower section. In particular, the device is configured to secure a tensioning mechanism directly to a flange at the end of the tower section (rather than another component of the tower section). Thus the forces required to modify the arrangement of holes within the flange (by which the tower section may be coupled to a further wind turbine section) can be minimised, thereby increasing safety. Moreover, the device is very flexible—it may be coupled in any hole within the plurality of through holes in the flange of a tower section, such that tensile forces may be applied to the flange at a wide variety of positions around the circumference of the flange and along a wide variety of directions. The device may hence be positioned where the correction will be most efficient, so the number of devices and the force applied may be minimized.

The device offers high levels of safety since it may be secured within a hole that extends through the flange of the tower section in a direction that is substantially parallel to the longitudinal axis of the tower section. In such cases the securing member cross-sectional plane in which tensile forces may be applied to modify the cross section of the tower section. The securing member is unlikely to be dislodged from these holes by the orthogonal tensile forces during use.

In preferred examples the device may comprise: an expansion bolt (wherein a sleeve or sheath of the expansion bolt forms the expandable securing member and the expansion mechanism comprises a threaded bolt that enters into and causes the sleeve or sheath to be forced open). Similarly, the device may comprise a securing member in the form of a wall plug (sometimes referred to as a rawlplug) which is deformed and driven outwards by the insertion of a screw (the forming part of the expansion mechanism). Alternatively or additionally, the device may comprise a hydraulic or electric expansion mechanism that is configured to expand the securing member.

Preferably the securing member may be contracted after its expansion (i.e. such that the securing member may be moved from an expanded arrangement to an unexpanded arrangement) so that the securing member may be released from a hole in which it is installed. Thus in preferred examples the securing member may be detachably secured within a hole in the flange of a wind turbine.

Preferably the securing member comprises at least first and second portions that are generally opposed, said first and second portions being arranged to come into contact with the internal wall when the securing member is expanded by the expansion mechanism. Therefore when the securing member is expanded within a hole, friction is generated between the internal wall of the hole and each of said first and second portions such that the expanded securing member is braced between the first and second portions and is securely retained within the hole. The first and second portions may form generally opposed parts of a generally circular or cylindrical securing member or may be opposed surfaces of a polygonal securing member. The securing mechanism may comprise from two to eight portions that are circumferentially arranged and may each engage the internal wall as the securing member is expanded. Preferably the securing member is configured to expand in a lateral direction that is substantially perpendicular to the direction along which the hole that the securing member is inserted or received extends in.

In a particularly preferred example the securing member comprises a hollow sheath having a sheath wall, with the first and second portions of the securing member both being part of the sheath wall; and wherein the expansion mechanism comprises a tapered member arranged to be moved axially within an open end portion of the hollow sheath; the tapered member being configured such that, as the tapered member is moved into the open end portion of the hollow sheath, a tapered surface of the tapered member contacts an internal surface of the sheath wall and urges the sheath wall outwards thereby expanding the securing member. Thus the sheath wall of the securing member may engage the internal wall of a hole when the securing member is expanded, securing the device within the hole.

The securing member may further comprise a shaft arranged to extend through the hollow sheath, the shaft comprising a threaded portion configured to engage a corresponding threaded portion of the tapered member such that rotation of one of the tapered member and the shaft relative to the other causes the tapered member to move axially along the shaft and thereby to move axially relative to the sheath. Thus the device acts as an expansion bolt, since the sheath is configured to expand as the threaded shaft and tapered member are rotated together using their threads. Such devices that comprise an expansion bolt are easy to manufacture and use, and simple to maintain.

In preferred examples the tapered member comprises a protrusion or cavity by which a tool may engage with the tapered member so as to apply a torque to the tapered member. Thus torque may be easily and conveniently applied to the tapered member to allow the tapered member to rotate relative to the shaft discussed above, such that the tapered member may be driven along the shaft and into the hollow sheath. Equally, the shaft may be provided with a protrusion, cavity or bolt head by which a tool may engage with the tapered member so as to apply a torque to the bolt. Said protrusion(s) may be engaged by a socket and/or wrench, and may take a triangular, square or hexagonal shape (although a wide variety of other shapes are equally suitable). Whereas said cavity or cavities may be engaged by a screw driver or drill, and may be formed a slot, a cross, a square, a triangle or hexagon (although a wide variety of alternative shapes are equally suitable). The protrusion or cavity may be arranged to be engaged via an open end of the flange through hole where the securing member is arranged.

Preferably the securing member comprises a distance measuring apparatus and/or a mount for a distance measuring apparatus. Such a distance measuring device may be configured to measure a distance relating to the cross section of the tower section (e.g. the diameter or width of the tower section, the length of the chord along which tension is applied and/or the distance between the portions of the flange to which tension is being applied) or the change in the cross section as during use of the system for modifying the cross section (see below). The tension applied by the tensioning mechanism to the flange of the tower may be easily controlled using these distance measurements. The distance measuring apparatus may comprise, for example, an infrared sensor, a laser sensor and/or a mirror configured to reflect the light emitted by such sensors, or an ultrasonic sensor.

By an attachment element configured to couple to the tensioning mechanism, it will be understood that the tensioning mechanism may be coupled to the attachment element directly, coupled to the attachment element via a further component such as a tether section, and/or that the tensioning forms part of the device, being integrally or permanently coupled to the securing member by the attachment element.

In further examples the device may comprise a horizontal alignment tool, the horizontal alignment tool configured such that when the securing member is secured within a hole in the flange of a tower section the guide rod extends or projects from the end of the tower section. The horizontal alignment tool may be configured to guide or urge a wind turbine section to which the tower section is to be couple into a correct position and/or orientation relative to the tower section with respect horizontal position (X,Y) and/or rotation round the longitudinal axis of the tower section. This may avoid the need for a human operator to monitor or adjust the arrangement of the sections relative to each other, thereby increasing safety.

In further examples the expansion device may further comprise a magnetic or electromagnetic mechanism configured to expand the expandable securing member and/or to contact an internal wall of a hole in which the securing member is inserted so as to restrict movement of the securing member relative to said hole by frictional resistance or to temporarily holding the securing member relative to the flange while expanding or contracting the expandable securing member.

In accordance with a further aspect of the invention there is provided a system for modifying the cross section of a tower section of a wind turbine comprising: a pair of devices according to the first aspect of the invention; a tether configured to extend between generally opposing sides of the tower section, each end of the tether being configured to attach to a respective device of the pair of devices; and a tensioning mechanism configured to couple to each of said pair of devices via the tether; the tensioning mechanism being further configured to apply a tensile force between said pair of devices via the tether.

These systems are configured to apply a tensile force between two different portions of the flange of a tower section, thereby modifying the cross section of the tower section (i.e. affecting the shape of the tower section). Consequently the tower section may be easily coupled to a further wind turbine section, even if the sections did not initially correspond. These systems are very compact (e.g. they may be stored and transported in a small container such as a suitcase) and may be quickly and safely installed and operated. These systems may further comprise any of the optional or preferable features of the devices discussed above and provide corresponding advantages.

These systems are extremely flexible and may be used to correct a wide variety of irregularities in the shape of the tower section. The pair of devices may be installed in any two holes of the plurality of through holes, at substantially any position around the circumference of the tower section, such that tensile forces may be applied in many different directions by the tensioning device. Two or more of the systems according to this aspect of the invention may be used in combination (i.e. such that each of the two systems form part of a wider system) to correct a greater range of irregularities in the cross section of a tower section.

The tensioning mechanism may comprise a turnbuckle; a winch; a ratchet; a hydraulic cylinder; or a threaded rod and a threaded bracket, the threaded road and threaded bracket that are configured to engage and move axially relative to each other. These options are easy to manufacture, operate and maintain, although any other suitable tensioning mechanism may also be used.

In preferred examples the tether comprises two tether sections, each tether section configured to attach to one of said pair of devices and wherein the tensioning mechanism is arranged to couple the two tether sections together. As such, the tensioning mechanism may be positioned between the pair of devices. However, in alternative examples the tensioning mechanism may be directly coupled to, or formed as part of, one of said pair of devices.

Preferably the tether comprises a material having an ultimate tensile strength of at least 0.8 GPa, preferably at least 1.5 GPa, more preferably at least 2 GPa and/or an elongation at breakage of less than 10%, preferably less than 5%, more preferably less than 4%. Typically, the ultimate tensile strength of the tether material us less than 4 GPa, and typically, the elongation at breakage is more than 2.5%. Materials with a high tensile strength and/or low elongation at breakage are particularly well suited for use in a tether or a tether section since they store low amounts of elastic potential energy when under load. Therefore, if any component of the system and/or the tower section were to fail the energy released by the tether would be reduced, thereby increasing safety and reducing the likelihood of damage to a tower section or the system (especially when using materials of relatively low weight). Preferably, the tether is highly flexible, being formed as a chain or polymer based rope or a polymer based sling, such that the tether that can be stored away in a small container, such as a suitcase.

Suitable materials for the tether and any tether sections include steel or other metals (e.g. in the form of a cable, chain or beam). However, ropes, slings or cables of high performance polymer fibres have been found to be highly advantageous. Preferred high-performance fibres include: aramids (e.g. Kevlar®, Twaron®, Technora®); high-modulus polyethylene which is also referred to as ultra-high molecular weight polyethylene or UHMWP (e.g. Spectra®, Dyneema®); aromatic polyester (e.g. Vectran®); Polyphenylene Benzobisoxazole or PBO (e.g. Zylon®). These are examples of high-strength, high-modulus, low-extension fibres. The high tensile strength of these fibres allows for thin—and hence light—tethers which may be manually handled and stored compactly. With a density of about 0.97 kg/m$^3$ UHMWPE is particularly advantageous for use with installing and maintaining offshore wind turbines since tethers and cables formed of UHMWPE will float on water.

Preferably the tensioning mechanism is configured to apply a tensile force of at least 50 kN, more preferably at least 100 kN, more preferably 150 kN. Preferably the tether is configured to transfer a tensile force of at least 50 kN, more preferably at least 100 kN, more preferably 150 kN. These forces are sufficient to modify the cross section of a wide variety of tower sections. Typically, the tether is configured to transfer a tensile force of less than 500 kN.

Preferably the system comprises a distance measuring apparatus configured to determine the distance between the pair of devices and/or between opposing portions of a tower section to which the pair of devices are secured, preferably wherein the distance measuring device is mounted to at least one of said pair of devices. The tension applied by the tensioning mechanism may be easily controlled using these distance measurements. The distance measuring apparatus may comprise, for example, an infra-red sensor, a laser sensor and/or a mirror configured to reflect the light emitted by such sensors, or an ultrasonic sensor.

In accordance with a further aspect of the invention there is provided a method for modifying the cross section of a tower section of a wind turbine, wherein the tower section comprises a flange located at an end of the tower section having a plurality of through holes spaced around its circumference for securing said tower section to another wind turbine section, the method comprising: securing a tensioning mechanism to each of a pair of said plurality of through holes in the flange of the tower section, said pair of holes being generally opposed; and applying a tensile force between said pair of holes in the flange of the tower section.

It will be seen that this method does not require the installation of any additional fixings or brackets to the tower section. Therefore, the method is very quick and avoids steps that might impact the strength of the tower. Moreover, by applying forces directly to the flange of the tower section the forces required to modify the cross section of the tower section (and the position of the plurality of through holes) is reduced, thereby increasing safety. Also, the use of already present flange through holes allows for arranging securing members where this will provide the most efficient adjustment of the shape of the cross section, which allows for use of less force and hence will be more safe during the process.

Preferably the tensioning mechanism is secured to the flange and applies a tensile force between said pair of holes in the flange of the tower section using a system in accordance with the invention as discussed above. Thus the tensioning mechanism may be secured to the flange using any of the devices discussed above with reference to the first aspect of the invention. In other words the method may be performed using any of the devices and systems discussed above, and offers corresponding benefits.

The methods discussed herein may be performed during storage and/or transportation of the tower section (e.g. to prevent the tower section becoming deformed and/or to correct a deformation). Equally, the methods may be performed during an pre-assembly process in which the tower section is coupled to a further wind turbine section (e.g. after the tower section has been upended) or during assembly of the wind turbine generator. Thus the methods, devices and system according to the invention may be implemented through the full value chain of the wind turbine.

Preferably during the method the system is installed to the holes in the flange from the inside of the tower—e.g. such that the devices discussed above are inserted into the holes in the flange of the tower section from an internal side of the flange. The interior of a tower section is often more convenient and safer to access than the exterior, especially when working offshore.

In preferred examples the devices discussed above may be secured within the holes such that the securing member, the devices and/or the system for modifying the cross section of the tower section do not extend or project from the end of the tower section. Thus the securing member, device and/or system will not interfere with or prevent a further wind turbine section from being brought into abutment with the tower section, and will not prevent the sections from being coupled together.

Preferably the method comprises the preceding step of: identifying that said plurality of through holes in the flange of the tower section are misaligned relative to a corresponding plurality of holes in another wind turbine section to which said tower section is to be coupled; wherein the tensile force is applied between said pair of holes in the flange of the tower section so as to modify the cross section of the tower section such that the plurality of through holes in the tower section are aligned with the plurality of holes in the wind turbine section to form pairs of aligned holes between the sections; and wherein the method comprises the subsequent step of: fitting a bolt or stud through at least one of the pairs of aligned holes whilst the tensile force applied by the tension mechanism is maintained.

Therefore, the method allows for a further section of a wind turbine (e.g. a further tower section, a foundation or a nacelle) to be coupled to the tower section using bolts and/or studs, even if the sections do not initially correspond. For instance, it may be identified that the sections have different diameters or widths, that one of the sections is deformed relative to the other section, and/or that the distribution of holes circumferentially around the sections are different. Subsequently the cross section of the tower section may be adjusted or modified to correct for these issues, and the tower section and the wind turbine section may be coupled together. Coupling the sections may comprise the steps of bringing the tower section and the wind turbine section into abutment to create the pairs of aligned holes (such each pair of aligned holes defines a void that extends continuously between the two sections and that may receive a bolt or stud). The method may further comprise adjusting the orientation and position of the wind turbine section relative to the tower section and/or the tower section relative to the wind turbine section so as to bring the corresponding pluralities of holes in the sections into alignment. This adjustment of the relative orientation and positions of the sections may be performed using a horizontal adjustment member (as discussed above) which may be provided separately or integrally to the systems and devices discussed above. In further examples the tower section may additionally or alternatively be welded to the wind turbine section.

In some examples the method may comprise inserting a bolt or stud through each pair of aligned holes to securely couple the tower section to the wind turbine section. For instance, a bolt or stud may be inserted through each of the plurality of holes in the tower section and/or each of the plurality of holes in the wind turbine section to which the tower section is to be coupled. However, in further examples bolts and/or studs may only be inserted into a subset of the pairs of aligned holes. For instance, tower sections for an offshore wind-turbine may be initially or temporarily coupled during an initial pre-assembly step onshore or to a tower connector on a transportation utility, such as a vessel, in this step bolts and/or studs are fitted into some of the pairs of aligned holes—e.g. said subset of holes may comprise at least 25% of the pairs of aligned holes, more preferably at least 50% of the pairs of aligned holes. Subsequently, the method may comprise transporting the coupled tower sections to their final position offshore, and fitting bolts and/or studs are inserted into the remaining pairs of aligned holes during a full assembly step.

In preferred examples the method may comprise the step of removing the tensile force applied by the tension mechanism, and then removing the tension mechanism from a hole to which it is secured; and fitting a bolt or stud through said hole to which the tensioning mechanism was secured and the corresponding aligned hole in the wind turbine section with which said hole to which the tensioning mechanism was secured forms a pair of aligned holes. Preferably, the step of removing the tensile force is conducted after bolts have been applied to at least some part of the aligned through holes of adjacent flanges, which are not occupied by the securing members.

The method may comprise securing each of a plurality of tensioning mechanisms between a respective pair of holes in said plurality of through holes in the flange of the tower section, the holes in each of said pairs of holes being generally opposed; and applying a tensile force between each of said pairs of holes using the plurality of tensioning mechanisms, the respective pairs of holes being selected such that the tensile forces are applied along a corresponding plurality of different directions.

In other words there may be provided a system which comprises a plurality of the tensioning mechanisms discussed above, a corresponding plurality of the tethers discussed above and a corresponding plurality of pairs of devices for connecting the tensioning mechanism to the flange of a tower section (as discussed above). In other words, the method may use a plurality of the systems discussed in relation to the second aspect of the invention above. These methods and wider systems allow for greater flexibility when adjusting the cross section of the tower section—i.e. such that a greater variety of deformations may be corrected—since tensile forces may be applied simultaneously along different directions (e.g. along directions that are angled or offset relative to each other). This is particularly beneficial when used to prevent deformation of the tower section during transportation or storage and when modifying the cross section of a tower section during a pre-assembly step where relatively large changes to the cross section may be required.

By referring to an advantage herein, it must be understood that this advantage may be seen as a possible advantage provided by the invention, but it may also be understood that the invention is particularly, but not exclusively, advantageous for obtaining the described advantage. In general, the various aspects and advantages of the invention may be combined and coupled in any way possible within the scope of the invention. These and other aspects, features and/or advantages of the invention will be apparent from and elucidated with reference to the embodiments described hereinafter.

BRIEF DESCRIPTION OF FIGURES

Specific examples of the invention will now be discussed with reference to the following figures:
FIG. 1 shows a cutaway perspective of a tower section of a wind turbine;
FIG. 2 shows a cutaway perspective of a tower section of a wind turbine and a system in accordance with the invention that has been installed within the tower section;
FIG. 3 shows a cutaway perspective of two coupled tower sections of a wind turbine and a system in accordance with the invention installed within one of said tower sections;
and
FIG. 4 shows a cutaway perspective of two coupled tower sections of a wind turbine.

DETAILED DESCRIPTION

Figure 1:
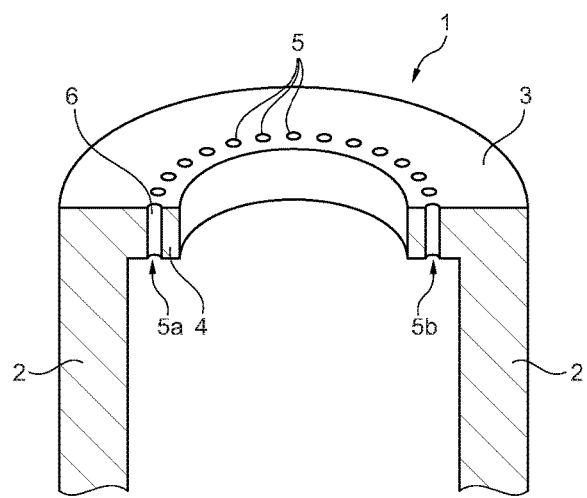
FIGS. 1 to 4 illustrate sequential steps of a method in accordance with the invention, as follows.

FIGS. 1 to 4 schematically show sequential steps of a method of coupling two sections of a wind turbine together. The method results in two tower sections 1, 1' being coupled together by bolts 20 that each extend through a pair of aligned holes in the flanges 4, 4' of the tower sections 1, 1'.

Each tower section 1, 1' has a substantially circular cross section and comprises a cylindrical wall 2, 2'. A peripheral or terminal flange 4, 4' extends radially inwards from the cylindrical wall 2, 2' at an end 3, 3' of each tower section 1, 1'. Each flange 4, 4' comprises a corresponding plurality of through holes 5, 5' that are arranged circumferentially around the respective flange 4, 4'. As will be seen from the figures, each hole in the plurality of through holes 5, 5' extends in a direction that is substantially parallel to the longitudinal axis of the respective tower section 1, 1'.

Figure 2:
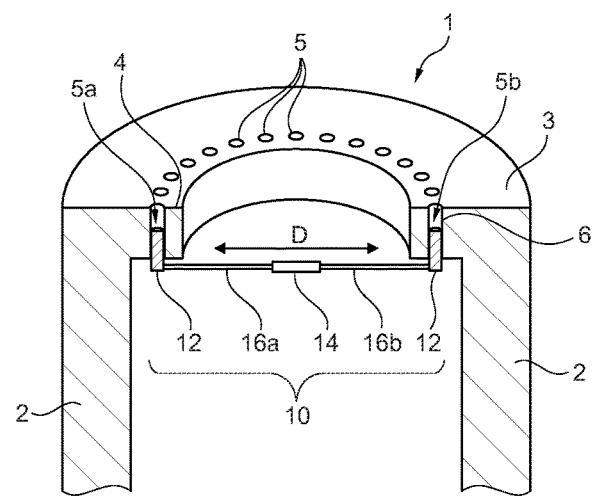
Figure 3:
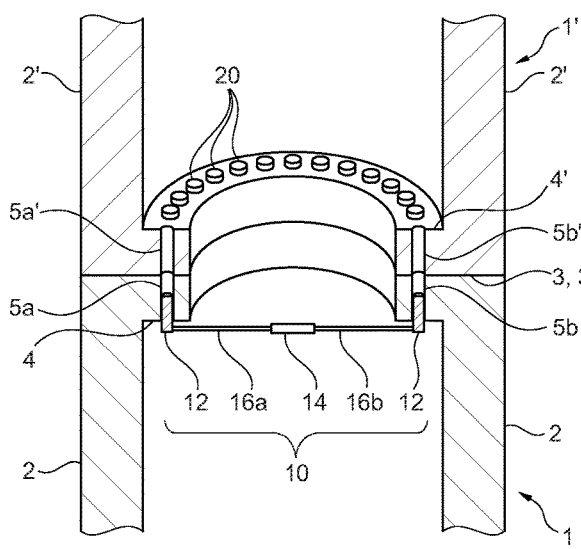

In an initial step of the method it is recognised that the plurality of holes 5 in the first tower section 1 (first shown in FIG. 1) do not correspond and cannot be aligned relative to the corresponding plurality of holes 5' in the second tower section 1' (first shown in FIG. 3). In other words, the cross sections of the two tower sections 1, 1' do not match. This inconsistency may be corrected using the system 10 shown in in FIGS. 2 and 3.

The system 10 comprises: a pair of securing devices 12 that may be detachably secured in any of the holes 5, 5' within the tower sections 1, 1', a tensioning mechanism 14 configured to apply tensile forces to the flanges 4, 4' of the tower sections 1, 1'; and two tether portions 16a, 16b that connect between the tensioning mechanism 14 and a respective device 12. The tether portions 16a, 16b are configured to transfer the tensile forces applied by the tensioning mechanism 14 to the respective securing device 12.

The devices 12 are each configured to be secured within the holes 5, 5' of the tower sections 1, 1' by an interference or friction fit. Each securing device 12 comprises an expandable securing member that may be inserted into a hole 5, 5' whilst the device is in an unexpanded arrangement. Subsequently, the securing member may be expanded (i.e. the device may be placed in an expanded arrangement) in which the securing member engages and is braced against the internal surface 6 of the hole 5, 5' such that movement of the securing member is restricted or prevented. To remove the device 12 from a hole in which it is secured the securing member may be contracted, returning the device to an unexpanded arrangement.

In the specific example shown in the figures, it is recognised that whilst the second tower section 1' is substantially circular, the first tower section 1 suffers from high ovality, such that the diameter of the first tower section 1 along an axis that extends between two opposed holes 5a, 5b is significantly larger than the diameter of the first tower section 1 along an orthogonal direction.

To reduce the diameter of the first tower section 1 in the direction that extends between the opposed holes 5a, 5b and correct this ovality, each of the securing devices 12 is inserted into and then secured within a respective hole of the two opposed holes 5a, 5b (as shown in FIG. 2). As shown, the two securing devices 12 are coupled or attached together by the tether portions 16a, 16b and the tensioning device 14. As will be seen from the figures, the securing devices 12 are inserted into their respective holes 5a, 5b from an internal side of the flange and neither the securing devices 12 or the system 10 as a whole protrudes or projects from the end 3 of the first tower section 1.

Subsequently, the tensioning device 14 is operated to apply a tensile force between the devices 12, as shown by arrow D in FIG. 2. Each device 12 transfers the tensile force applied by the tensioning device 14 to the respective hole 5a, 5b in which it is inserted, such a tensile force is applied to the flange in a direction defined by a line connecting the two securing devices 12 along which the tether sections 16a, 16b extend (i.e. parallel to arrow D). Under the application of the tensile force, the diameter of the first tower section 1 that extends between the opposed holes 5a, 5b is reduced and the ovality of the first tower section 1 is corrected. The tensile force applied by the tensioning mechanism 14 is controlled such that the cross section of the first tower section 1 is modified to match the cross section of the second tower section 1' (e.g. based on measurements of the diameters of the first tower section 1 or based on visual observation of alignment of through holes of two adjacent flanges).

Whilst a tensile force is still applied by the tensioning device 14 (such that the modified cross section of the first tower section 1 is maintained) the ends 3, 3' of the first and second tower sections 1, 1' are brought into abutment in a positioning and orientation in which the plurality of holes 5, 5' in the tower sections 1, 1' are aligned. Thus each hole in the plurality of through holes 5 in the first tower section 1 is aligned with a corresponding hole in the plurality of through holes 5' in the second tower section 1', such that said holes form an aligned pair and thus define a continuous void or aperture that extends through the flanges 4, 4' of both tower sections 1, 1'. Subsequently, to couple the tower sections 1, 1' together, a bolt 20 is inserted or fitted through each pair of aligned holes other than the pairs of aligned holes that comprise opposed holes 5a, 5b in which the securing devices 12 are installed (as shown in FIG. 3).

Figure 4:
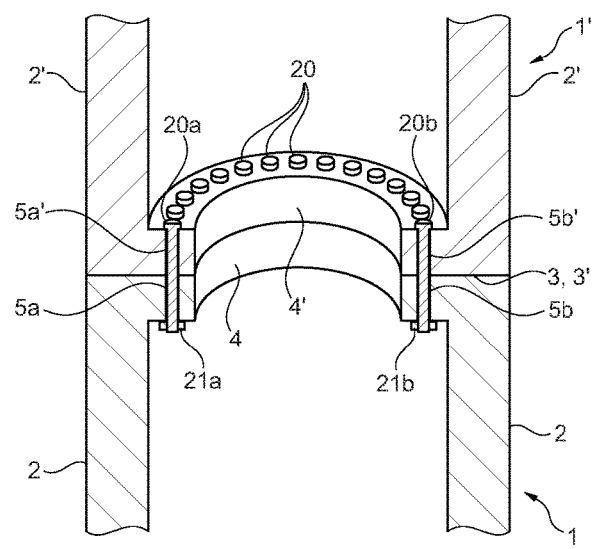

As shown in FIG. 4, while the bolts 20 retain the shape of the tower section, the system 10 used to modify the cross section of the first tower section 1 is then detached from the first tower section 1 by operating the tension mechanism to remove the tensile force applied to the flange 4 and contracting the securing member of each securing device 12 to release the securing member from the internal surface 6 of its respective hole 5a, 5b. A bolt 20a, 20b is inserted or fitted through the aligned pairs of holes comprising the opposed holes 5a, 5b in the first tower section 1 and the corresponding holes 5a', 5b' in the second tower section 1'. As shown in FIG. 4, the bolts 20, 20a, 20b that couple the tower sections may be retained in their respective pair of aligned holes using nuts 21a, 21b and retain the two tower sections together in the suitable shape.

Using this method the tower sections 1, 1' of a wind turbine may be quickly and safely coupled to form the tower of a wind turbine despite initial inconsistencies between the cross sections of the two tower sections 1, 1'. A corresponding method of installing the system 10 and applying tensile forces to the flange of a tower section may also be used during storage or transportation of a tower section to prevent and/or correct deformations in the shape of the tower section—i.e. without coupling the tower section to a further wind turbine section.

Examples of securing devices 100, 200, 300 suitable for use in the methods and systems covered above will now be discussed in relation to the schematic cross sections of FIGS. 5a, 5b, 6 and 7. A wide variety of devices configured to be detachably secured in a hole in a flange of a tower section of a wind turbine are suitable for use in the methods discussed above.

Figure 5:
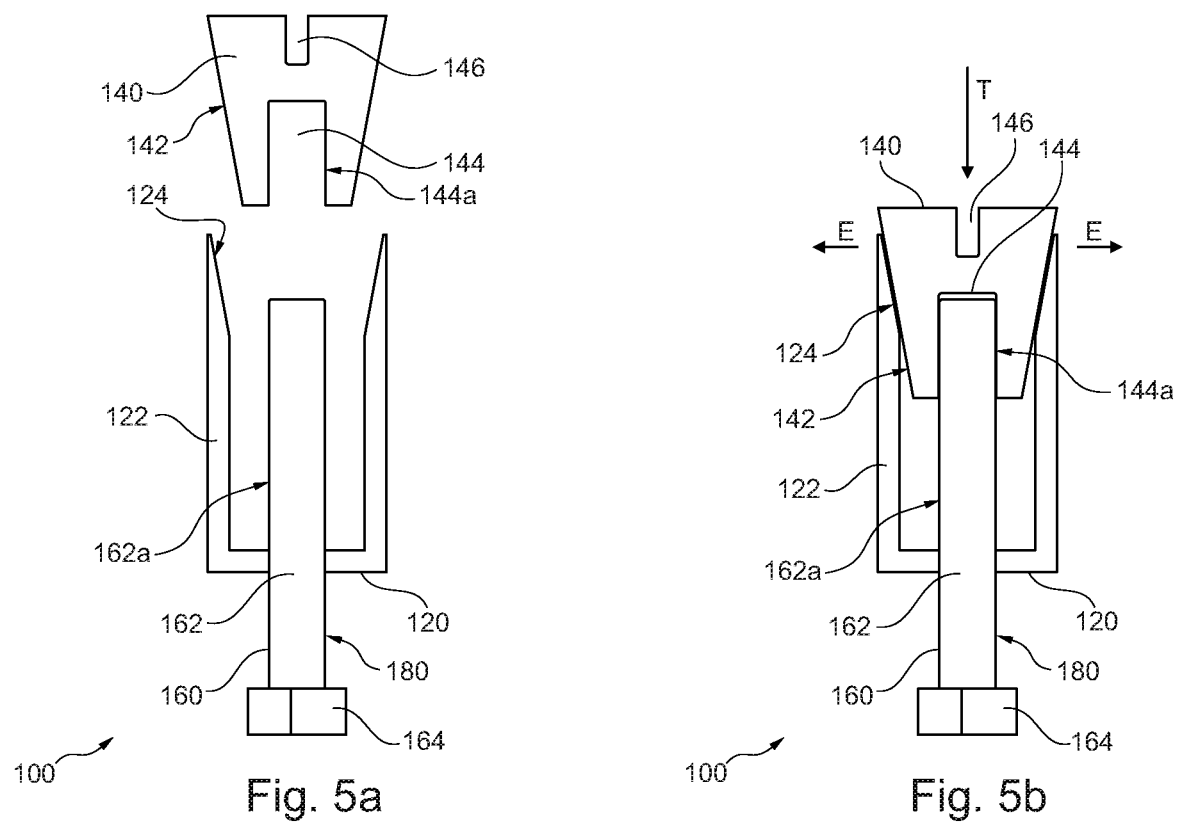
FIGS. 5a and 5b are schematic cross sections of a device in accordance with the invention in two alternative arrangements.

The securing device 100 shown in FIGS. 5a and 5b comprises a hollow sheath 120 which forms an expandable securing member and a tapered nut 140 (i.e. a tapered member) and a bolt 160 which together act as an expansion mechanism. The securing device 100 is shown in an unexpanded arrangement in FIG. 5a, and in an expanded arrangement in FIG. 5b.

The hollow sheath 120 is cylindrical and comprises an outer wall 122. The bolt 160 comprises a shaft 162 that is fixed to the hollow sheath 120 and extends into the internal volume of the hollow sheath 120, and a bolt head 164 by which a torque may be applied to the bolt using a tool (e.g. a wrench). The width of the tapered nut 140 varies along the length of the tapered nut 140. Specifically, the tapered nut 140 is formed as a frustum or truncated cone, having a width that increases linearly along its length. Thus the tapered nut 140 comprises a tapered surface 142 that has a conical shape. The tapered nut 140 further comprises a cavity 146 by which torque may be applied to the nut 140 via the flange hole from the opposite side than the bolt head 164 (e.g. using tool such as a screwdriver or key). The shaft 162 of the bolt 160 comprises a threaded surface 162a that is configured to engage a corresponding threaded surface 144a in a shaft receiving hole 144 of the tapered nut 140. The bolt head 164 is spaced relative to the hollow sheath 120 such that the exposed portion 180 of the shaft 162 of the bolt that extends between the bolt head 164 and the hollow sheath 120 may act as an attachment element by which a tensioning member may be coupled to the securing device 100 (e.g. directly or using a tether).

In the unexpanded arrangement shown in FIG. 5a the bolt 160 and the tapered nut 140 are separated. To expand the outer wall 122 of the hollow sheath 120 the tapered nut 140 and the bolt 160 are engaged and the shaft 162 of the bolt 160 is driven into the shaft receiving hole 144 of the tapered nut 140. To achieve this opposing torques may be applied to the bolt 160 and the tapered nut 140 via the bolt head 164 and the cavity 146, respectfully, such that the tapered nut 140 is rotated relative to the bolt 160. As the tapered nut 140 rotates in this manner it will moves axially relative to the bolt 160 and the hollow sheath 120 (as shown by arrow T in FIG. 5b).

As the tapered nut 140 is moved into the hollow sheath 120 the tapered surface 142 of the tapered nut 140 engages an internal surface 124 of the outer wall 122 of the hollow sheath 120, forcing (i.e. urging) the outer wall 122 outwards as shown by arrows E in FIG. 5b. Therefore, the outer wall 122 of the hollow sheath 120 expands laterally—i.e. in a direction that is orthogonal to the direction in which the sheath 120 extends. As shown the internal surface 124 of the outer wall 122 has a conical shape to match the tapered surface 142 of the tapered nut 140 but this is not essential.

In general, the tapered nut 140 should have a cross section, which is smaller than the width of the through hole of the flange to ensure that the tapered nut will not get stuck between the flanges when the two flanges are connected. Similarly, the cross section of the hollow sheath 120 before being forced outwards is preferably smaller than the cross section of the through hole of the flange as this facilitate easy introduction of the expansion bolt into the through hole of the flange. It should be observed that in some cases, the cross section of the hollow sheath 120 may be similar or slightly larger than the cross section of the through hole of the flange to enhance building of a strong force towards the walls of the hole during installation of the securing member.

If the tapered nut 140 is driven into the hollow sheath 120 as the securing device 100 is positioned within a hole (e.g. a hole within the flange of a section of a wind turbine) the outer wall 122 of the hollow sheath 120 may expand and engage an internal surface of the hole. Thus the opposed portions may expand in a lateral direction that is orthogonal relative to the direction in which the hole extends. As such, generally opposed portions of the hollow sheath 120 will be braced against generally opposed portions of the internal surface and will restrict movement to the securing device 100 relative to the hole due to frictional resistance between the components. In such an arrangement the hollow sheath 120 may transfer forces (e.g. tensile forces generated by a tensioning mechanism coupled to the securing device 100 by the exposed portion 180 of the bolt 160) to the internal surface that defines the hole. It will be seen that the securing device 100 is detachably secured within the hole since unfastening the tapered nut 140 from the bolt 160 will cause the hollow sheath 120 to relax, thereby releasing the securing device 100 from the hole in which it is fitted.

Figure 6:
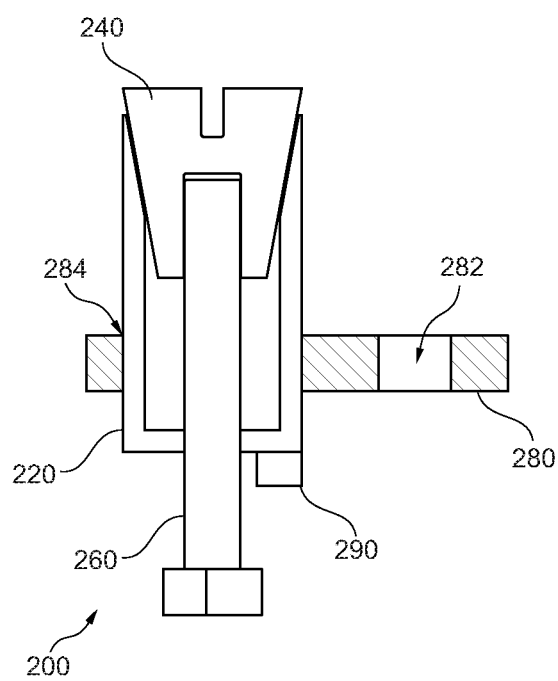
FIG. 6 shows a schematic cross sections of a further device in accordance with the invention.
Figure 7:
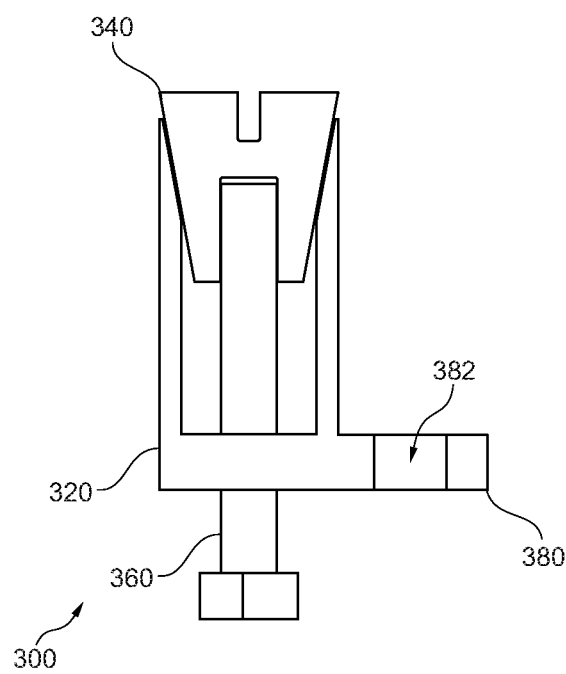
FIG. 7 shows a schematic cross sections of a further device in accordance with the invention.

FIGS. 6 and 7 show similar securing devices 200, 300 that are again formed as expansion bolts, but vary in the form of their attachment elements. Each of these securing devices 200, 300 comprises a hollow sheath 220, 320, a tapered nut 240, 340 and a bolt 260, 360 with similar features and functions as the corresponding components of the securing device 100 shown in FIGS. 5*a* and 5*b*. The securing devices 200, 300 are shown in an expanded arrangement in FIGS. 6, 7 in which the tapered nut 240, 340 is driven into the hollow sheath 220, 320 by the bolt 260, 360 so as to expand the outer wall of the hollow sheath.

The securing device 200 of FIG. 6 comprises an attachment element 280 formed as a sheet in which are provided two through holes 282, 284. The hollow sheath extends through and is fixed within one of these holes 284, whereas a tensioning mechanism may be coupled to the securing device 200 via the other, open hole 282 (e.g. directly or using a tether or tether section).

The securing device 300 of FIG. 7 comprises an attachment element 380 that is formed integrally as part of the hollow sheath 320 (e.g. the attachment element 380 and hollow sheath 320 may be welded together or cast as a single component). The attachment element 380 projects from the outer wall of the hollow sheath 320 and defines a through hole 382 by which a tensioning mechanism may be coupled to the securing device 300 (e.g. directly or using a tether or tether section).

In addition, the securing device 200 of FIG. 6 comprises a distance measuring device 290 mounted on a closed end of the hollow sheath 220. The distance measuring device 290 (e.g. a laser, infrared or ultrasound sensor) is configured to periodically or continuously measure a distance associated with the width of a tower section along a direction in which tensile forces are to be applied. Thus the effect of the tensile forces applied to the tower section via the securing device 200 may be measured and the tensile forces may be controlled using these distance measurements.

Finally the manner in which an inconsistency or discrepancy between the cross sections of a tower section of a wind turbine and a further section of a wind turbine may be identified will be discussed with reference to FIG. 8. In some cases it may be recognised that the cross sections of the tower section and a further section of a wind turbine may be determined by directly measuring each section. However, it may happen that the mismatch or misalignment between sections is not recognised until a wind turbine is being assembled.

Figure 8:
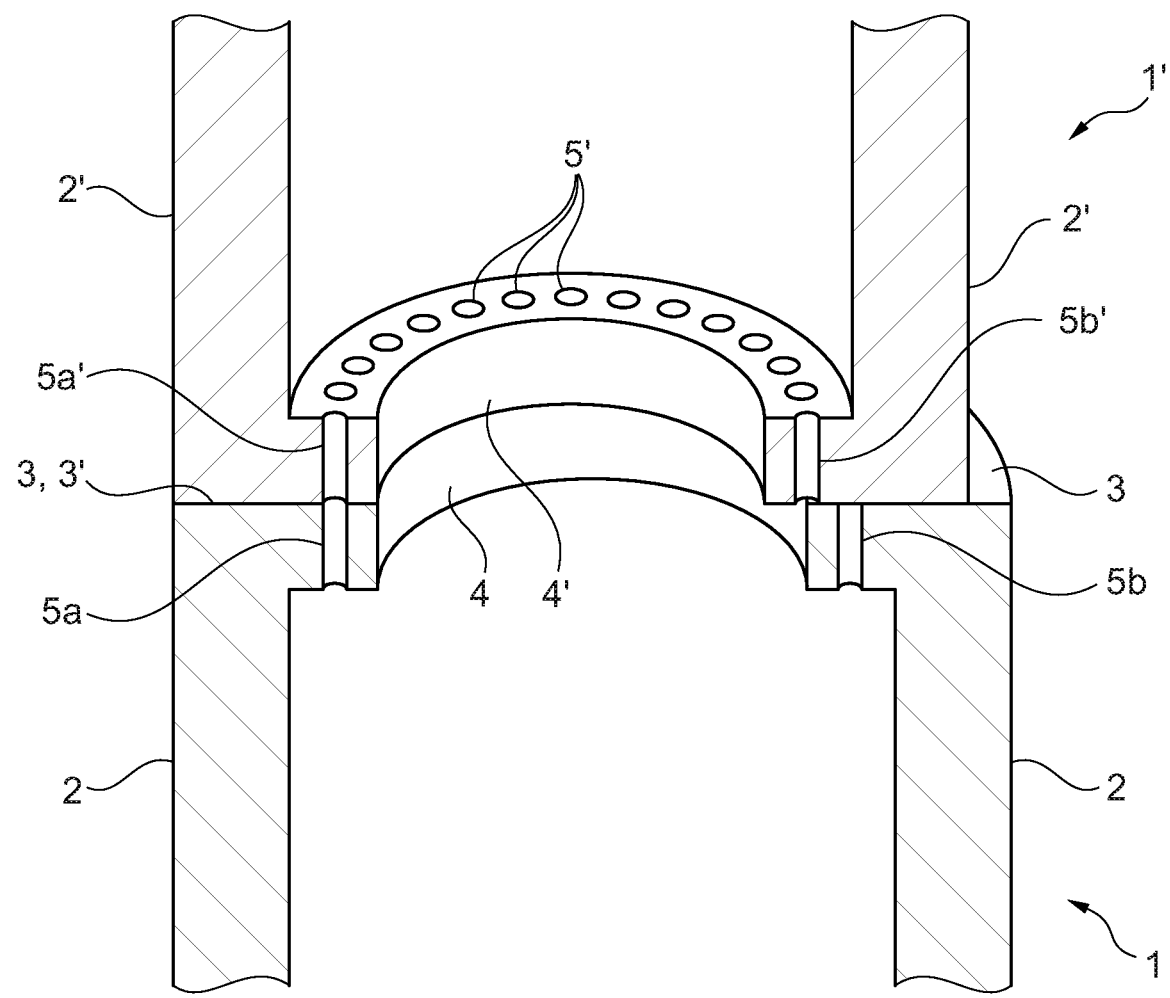
FIG. 8 shows a cutaway perspective view of two tower sections of a wind turbine.

FIG. 8 shows the first and second tower sections 1, 1' previously discussed with reference to FIGS. 1 to 4. As shown, the tower sections 1, 1' have in an initial step been brought into abutment such that the ends 3, 3' of each tower section 1, 1' (and hence the peripheral or terminal flanges 4, 4' of each tower section 1, 1') are in contact—e.g. in an attempt to couple the tower section 1, 1' together. However, due to the high initial ovality of the first tower section 1, it is identified or recognised that the cross sections of the tower sections 1, 1' do not correspond. Indeed, as shown, the flange 4 of the first tower section 1 is significantly wider than the flange 4' of the second tower section 1' and the pluralities of holes 5, 5' in the tower sections 1, 1' cannot be aligned to form a corresponding plurality of pairs of aligned holes into which bolts can be fitted (e.g. although holes 5*a* and 5*a*' are aligned in FIG. 8, the opposing holes 5*b* and 5*b*' are laterally offset). Hence, it is identified or determined that the tower sections 1, 1' cannot be safely coupled.

However, having identified that the cross sections of the tower sections 1, 1' are inconsistent, the method steps discussed above with reference to FIGS. 2 to 4. The system 10 shown in FIGS. 2 and 3 may be used to apply tensile forces to modify the shape of the flange 4 of the first tower section 1, before the two tower sections 1, 1' are coupled via the through holes 5*b* and 5*b*' (e.g. using the bolts 20 shown in FIGS. 3 and 4). Advantageously, this modification of the cross section of the first tower section 1 using system 10 can be performed on-site immediately after the misalignment between the tower sections 1, 1' is identified and without any preparation of the tower wall 2 or flange 4 of the first tower section 1. It should be observed that the flanges may be coupled via some or all of the through holes which are sufficiently aligned (such as example 5a and 5a') may be connected prior to modification of the cross section of the first tower section 1 using system 10.

It should also be observed that the system 10 may be applied to the upper flange 2 if the diameter i.e. distance between certain wall parts of the tower is too large and needs to be reduced. Similarly, situations where both the upper flange and the lower flange needs to be adjusted in different directions using the system 10 may also occur.

An important application of the device and system for modifying the cross section of a tower section according to the invention is to apply to system for preventing development of ovality of a tower section over time. This is particularly relevant when tower sections or pre-fabricated towers are stored for extended times. A method of using the system according to the invention is therefore to provide the system to a tower section, thereafter store the tower section for at least 6 months (and preferably at least 12 months) followed by connecting of the tower section to a further tower section of other wind turbine generator component, where after the system is released. Optionally, the tower section is transported (horizontally oriented or vertically oriented) after the system is applied and before the system is released. Optionally the tower section is upended after the system is applied and before the system is released. The use of the system according to the invention for these methods and applications are particularly advantageous as traditional systems for maintaining cross sectional shape (i.e. prevent ovality formation) is heavy and costly, and the present system therefore may save considerable cost and reduce tool requirement (such as crane for transporting the system) for handling of the system.

Although the present invention has been described in connection with preferred embodiments, it is not intended to be limited to the specific form set forth herein.

Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims however the inclusion of the reference signs is only for clarity reasons and should not be construed as limiting the scope of the claims.

The invention claimed is:

1. A system for modifying a cross section of a tower section of a wind turbine, wherein the tower section comprises a flange located at an end of the tower section having a plurality of through holes spaced around its circumference for securing the tower section to another wind turbine section, the system comprising:
   a pair of devices, wherein each of the pair of devices comprises:
      an expandable securing member configured to be located within one of the plurality of through holes in the flange; and
      an expansion mechanism configured to expand the securing member so as to urge the securing member into contact with the one of the plurality of through holes such that the securing member is braced against an internal wall and removal of the expanded securing member from the one of the plurality of through holes is thereby inhibited by frictional resistance between the securing member and the internal wall;
   a tether configured to extend between generally opposing sides of the tower section, each end of the tether being configured to attach to a respective device of the pair of devices; and
   a tensioning mechanism configured to couple to each of the pair of devices via the tether and further configured to apply a tensile force between the pair of devices via the tether.

2. The system of claim 1, wherein the securing member comprises at least first and second portions that are generally opposed, said first and second portions being arranged to come into contact with the internal wall when the securing member is expanded by the expansion mechanism.

3. The system of claim 2, wherein the securing member comprises a hollow sheath having a sheath wall, with the first and second portions of the securing member both being part of the sheath wall;
   wherein the expansion mechanism comprises a tapered member arranged to be moved axially within an open end portion of the hollow sheath; and
   wherein the tapered member is configured such that, as the tapered member is moved into the open end portion of the hollow sheath, a tapered surface of the tapered member contacts an internal surface of the sheath wall and urges the sheath wall outwards thereby expanding the securing member.

4. The system of claim 3, wherein the securing member further comprises a shaft arranged to extend through the hollow sheath, the shaft comprising a threaded portion configured to engage a corresponding threaded portion of the tapered member such that rotation of one of the tapered member and the shaft relative to the other causes the tapered member to move axially along the shaft and thereby to move axially relative to the hollow sheath.

5. The system of claim 3, wherein the tapered member comprises a protrusion or cavity by which a tool may engage with the tapered member so as to apply a torque to the tapered member.

6. The system of claim 1, wherein the securing member comprises a distance measuring apparatus and/or a mount for a distance measuring apparatus.

7. The system of claim 1, wherein the tensioning mechanism comprises:
   a turnbuckle; a winch; a ratchet; a hydraulic cylinder; or a threaded rod and a threaded bracket, the threaded rod and threaded bracket being configured to engage and move axially relative to each other;
   wherein the tether comprises two tether sections, each tether section configured to attach to one of said pair of devices and wherein the tensioning mechanism is arranged to couple the two tether sections together.

8. The system of claim 1, wherein the tether comprises a material having an ultimate tensile strength of at least 0.8 GPa and/or an elongation at breakage of less than 10%.

9. The system of claim 8, wherein the tether comprises a material having an ultimate tensile strength of at least 1.5 GPa.

10. The system of claim 8, wherein the tether comprises a material having an ultimate tensile strength of at least 2 GPa.

11. The system of claim 8, wherein the tether comprises a material having an elongation at breakage of less than 5%.

12. The system of claim 8, wherein the tether comprises a material having an elongation at breakage of less than 4%.

13. The system of claim 1, the system comprising a distance measuring apparatus configured to determine the distance between the pair of devices and/or between opposing portions of the tower section to which the pair of devices are secured, wherein the distance measuring device is mounted to at least one of the pair of devices.

14. A method for modifying the cross section of a tower section of a wind turbine, wherein the tower section comprises a flange located at an end of the tower section having a plurality of through holes spaced around its circumference for securing said tower section to another wind turbine section, the method comprising:

providing at least one system according to claim 1;

locating each of the pair of devices in a respective one of the plurality of through holes in the flange, the pair of the plurality of through holes in which the pair of devices are located being generally opposed to each other;

for each of the pair of devices, expanding the securing member using the expansion mechanism to inhibit removal of the device from its respective one of the plurality of through holes;

securing a tensioning mechanism to each of the pair of devices using the tether; and applying a tensile force between said pair of devices using the tensioning mechanism.

15. The method of claim 14 comprising the preceding step of:

identifying that the plurality of through holes in the flange of the tower section is misaligned relative to a corresponding plurality of holes in the another wind turbine section to which the tower section is to be coupled;

wherein the tensile force is applied between the pair of devices in the flange of the tower section so as to modify the cross section of the tower section such that the plurality of through holes in the tower section are aligned with the plurality of holes in the another wind turbine section to form pairs of aligned holes between the sections tower section and the another wind turbine section; and and wherein the method comprises the subsequent step of:

fitting a bolt or stud through at least one of the pairs of aligned holes whilst the tensile force applied by the tension mechanism is maintained.

16. The method of claim 15, the method further comprising the steps of:

removing the tensile force applied by the tension mechanism, and then removing at least one of the pair of devices from its respective one of the plurality of through holes in the flange; and fitting a bolt or stud through the respective one of the plurality of through holes to which the tensioning mechanism was secured and the corresponding aligned hole in the another wind turbine section.

17. The method of claim 14, wherein providing the at least one system includes providing a plurality of systems, the method further comprising:

for each system of the plurality of systems, repeating the locating, expanding, securing and applying steps;

wherein the tensile force from each of the plurality of systems is applied in a different direction.

\* \* \* \* \*